US012612476B2

(12) United States Patent
Lee et al.

(10) Patent No.: US 12,612,476 B2
(45) Date of Patent: Apr. 28, 2026

(54) POLYMERIZATION METHOD OF ULTRA HIGH MOLECULAR WEIGHT POLYETHYLENE AND METHOD FOR PREPARING CATALYST THEREOF

(71) Applicant: HANWHA TOTALENERGIES PETROCHEMICAL CO., LTD., Seosan-Si (KR)

(72) Inventors: Seung Yeop Lee, Seosan-Si (KR); Jin Woo Lee, Seosan-Si (KR)

(73) Assignee: HANWHA TOTALENERGIES PETROCHEMICAL CO., LTD., Seosan-si (KR)

( * ) Notice: Subject to any disclaimer, the term of this patent is extended or adjusted under 35 U.S.C. 154(b) by 646 days.

(21) Appl. No.: 18/098,178

(22) Filed: Jan. 18, 2023

(65) Prior Publication Data

US 2023/0279164 A1 Sep. 7, 2023

(30) Foreign Application Priority Data

Jan. 18, 2022 (KR) ........................ 10-2022-0007430

(51) Int. Cl.

*C08F 4/602* (2006.01)
*C08F 4/622* (2006.01)
*C08F 110/02* (2006.01)

(52) U.S. Cl.

CPC .......... *C08F 110/02* (2013.01); *C08F 4/6026* (2013.01); *C08F 4/6226* (2013.01); *C08F 2410/03* (2013.01)

(58) Field of Classification Search

None
See application file for complete search history.

(56) References Cited

U.S. PATENT DOCUMENTS

| | | | | | |
|---|---|---|---|---|---|
| 4,962,167 | A * | 10/1990 | Shiraishi | C08F 10/02 526/124.8 |
| 5,055,535 | A * | 10/1991 | Spitz | C08F 10/00 526/904 |
| 5,254,517 | A * | 10/1993 | Shamsoum | C08F 10/00 502/103 |
| 2002/0045537 | A1 | 4/2002 | Yang et al. | |
| 2016/0347881 | A1 | 12/2016 | Patil et al. | |
| 2017/0355792 | A1* | 12/2017 | Wang | C08F 4/6425 |

FOREIGN PATENT DOCUMENTS

| | | | | |
|---|---|---|---|---|
| CN | 101096389 | A | 1/2008 | |
| JP | S59210907 | A | 11/1984 | |
| JP | H01129006 | A | 5/1989 | |
| JP | H0220510 | A | 1/1990 | |
| JP | H06199927 | A | 7/1994 | |
| JP | H06279529 | A | 10/1994 | |
| KR | 100351386 | B1 | 9/2002 | |
| KR | 101161752 | B1 | 7/2012 | |
| WO | WO-9522568 | A1 * | 8/1995 | C08F 4/6143 |

OTHER PUBLICATIONS

Office Action from corresponding Japanese Application No. 10-2022-0007430, dated Jan. 9, 2024.
Office Action issued in corresponding Chinese Patent Application No. 202211744292.0 dated Aug. 12, 2024, with English translation (16 Pages).
Korean Office Action for Application No. 10-2022-0007430 dated Jun. 3, 2024 with English translation (16 pages).

* cited by examiner

*Primary Examiner* — Richard A. Huhn
(74) *Attorney, Agent, or Firm* — Harness, Dickey & Pierce, P.L.C.

(57) ABSTRACT

The present disclosure provides a method for polymerizing ultra-high molecular weight polyethylene and a method for preparing the catalyst thereof by reacting a main catalyst, a cocatalyst mixed with two or more types of organoaluminum, and an organosilane compound in the polymerization of ultra-high molecular weight polyethylene to have high activity, high bulk density, and high molecular weight while simultaneously having low particle agglomeration.

9 Claims, No Drawings

POLYMERIZATION METHOD OF ULTRA HIGH MOLECULAR WEIGHT POLYETHYLENE AND METHOD FOR PREPARING CATALYST THEREOF

CROSS-REFERENCE TO RELATED APPLICATION

This application is based on and claims priority from Korean Patent Application No. 10-2022-0007430 filed Jan. 28, 2022. The entire disclosure of the above application is incorporated herein by reference.

FIELD

The present disclosure relates to a method for polymerizing ultra-high molecular weight polyethylene having a large molecular weight and a method for preparing catalyst thereof.

BACKGROUND

This section provides background information related to the present disclosure which is not necessarily prior art.

Ultra-high molecular weight polyethylene is a type of polyethylene resin, refers to polyethylene having a molecular weight of at least $10^6$ g/mol or more, and is defined as "linear polyethylene having a relative viscosity of 2.30 or more at 135° C., which is contained in 0.05% of 100 ml of decahydronaphthalene solution" in ASTM 4020. Ultra-high molecular weight polyethylene has a very large molecular weight compared to general-purpose polyethylene to have excellent properties such as rigidity, abrasion resistance, environmental stress uniformity, self-lubrication, chemical resistance, and electrical properties. Due to excellent physical properties as described above, it can be said that ultra-high molecular weight polyethylene is a high-quality special material obtained from general-purpose raw materials.

Ultra-high molecular weight polyethylene manufactured through the polymerization process has a high molecular weight so that it cannot be pelletized like general-purpose polyethylene, and thus it is produced and sold as a powder. Thus, it can be said that the size and distribution of the polymer powder are very important, and the particle distribution of the polymer and the presence of fine particles are important characteristics of the catalyst.

As a prior art, a catalyst for preparing ultra-high molecular weight polyethylene containing magnesium based on titanium and a catalyst manufacturing process thereof have been reported. In particular, known is a method using a magnesium solution to obtain the above-mentioned olefin polymerization catalyst having a high bulk density. U.S. Pat. No. 4,962,167 discloses a process for preparing the catalyst obtained by reacting a reactant of a magnesium halide compound and a titanium alkoxide compound with a reactant of an aluminum halide and a silicon alkoxide compound. The catalyst prepared in this manner provides a relatively high bulk density, but there is still room for improvement. In addition, there is a need to improve the activity of the catalyst. In addition, U.S. Pat. No. 5,587,440 reports a method for producing a polymer having a narrow particle distribution and a high bulk density by reducing a titanium (IV) halide with an organoaluminum compound and then undergoing a post-treatment process with an organoaluminum compound, but there is a problem that the activity of the catalyst is relatively low.

Korean Patent No. 0822616 discloses a method for producing a titanium-containing catalyst comprising magnesium, titanium halogen and a silane compound, which can produce an ultra-high molecular weight polyolefin polymer with high catalytic activity, high bulk density, and narrow molecular weight distribution. Korean Patent No. 0351386 discloses a catalyst for preparing ultra-high molecular weight polyethylene with high catalytic activity, high bulk density, and narrow polymer particle distribution and a method for preparing the same, the catalyst being prepared by a process in which a magnesium compound solution is prepared by contacting and reacting a mixture of a magnesium halide compound and an aluminum or boron compound with alcohol, followed by reacting the result with an ester compound containing at least one hydroxyl group and a silicone compound having an alkoxy group, and then adding a mixture of a titanium compound and a silicone compound. The above two methods use batch polymerization, so they have a disadvantage in that productivity is lowered compared to the continuous polymerization method.

The activity, bulk density, and molecular weight of ultra-high molecular weight polyethylene vary greatly depending on polymerization conditions. When the polymerization is performed by lowering the temperature to increase the molecular weight, the productivity is lowered due to the low activity. Therefore, there is a need for a technique capable of polymerizing ultra-high molecular weight polyethylene at a general polyethylene polymerization temperature.

SUMMARY

This section provides a general summary of the disclosure, and is not a comprehensive disclosure of its full scope or all of its features.

The present disclosure provides a method for polymerizing an ultra-high molecular weight polyethylene and a method for preparing the catalyst thereof to efficiently polymerize ultra-high molecular weight polyethylene having high activity, high bulk density, high molecular weight, and low particle aggregation.

The present disclosure provides a method for polymerizing ultra-high molecular weight polyethylene, the method comprising: reacting a main catalyst including a titanium active site, an organoaluminum cocatalyst mixed with two or more types of organoaluminum, and an organosilane compound to polymerize ultra-high molecular weight polyethylene.

In addition, the present disclosure provides a method for preparing the main catalyst used for ultra-high molecular weight polyethylene polymerization by reacting a main catalyst including a titanium active site, an organoaluminum cocatalyst mixed with two or more types of organoaluminum, and an organosilane compound. The method for preparing the catalyst comprises steps of: preparing a magnesium compound solution by reacting the magnesium dichloride ($MgCl_2$) with an alcohol; preparing a precursor by reacting the magnesium compound solution with titanium tetrachloride; and preparing a catalyst by primary-reacting the precursor with titanium tetrachloride, and then reacting the result with a diester compound.

In addition, the present disclosure includes an ultra-high molecular weight polyethylene having polymerization activity of 5 to 40 kg-PE/g-catalyst, the viscosity average molecular weight of 2.0 to $10.0 \times 10^6$ g/ml, the bulk density of 0.30 to 0.50 g/ml, and particle aggregation having 1 um or more of 8.0 wt % or less.

The method for polymerizing ultra-high molecular weight polyethylene polymerization according to an embodiment of the present disclosure is used to efficiently polymerize ultra-high molecular weight polyethylene having high activity, high bulk density, high molecular weight, and low particle aggregation.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DETAILED DESCRIPTION

Example embodiments will now be described more fully with reference to the accompanying drawings.

In adding reference numerals to components of each drawing, the same components may have the same reference numerals as much as possible even though they are indicated in different drawings. Further, in describing the present embodiments, when it is determined that a detailed description of a related well-known configuration or function may obscure the gist of the present technical idea, the detailed description may be excluded. When the term "include," "have," "consist of," etc. mentioned in this specification are used, other parts may be added unless "only" is used. When a component is expressed in the singular, the plurality of components may be included unless otherwise explicitly stated.

In addition, in describing the components of the present disclosure, terms such as first, second, A, B, (a), (b), etc. may be used. These terms are only for distinguishing the components from other components, and the essence, order, sequence, or number of the components are not limited by the terms.

In the description of the positional relationship of components, when two or more components are described as being "coupled," "combined," or "connected," two or more components are directly "coupled," "combined," or "connected," but it will be understood that two or more components and other components may be "coupled," "combined," or "connected" by interposition. Here, other components may be included in one or more of two or more components that are "coupled," "combined," or "connected" to each other.

In the description of the temporal flow relation related to the components, the operation method or the manufacturing method, for example, the temporal precedence relationship or flow precedence relationship is described with "after", "subsequently", "next", "before", etc., it may include a case where it is not continuous unless "immediately" or "directly" is used.

Meanwhile, when numerical values or corresponding information (e.g., level, etc.) for a component are mentioned, even if there is no explicit description separately, the numerical value or the corresponding information may be interpreted as including an error range that may be caused by various factors (e.g., process factors, internal or external shock, noise, etc.).

In this specification, the organosilane compound may be used as an organosilane external donor or an organosilane external electron donor, but is not limited to this term.

The present disclosure provides a method for polymerizing ultra-high molecular weight polyethylene, which polymerizes ultra-high molecular weight polyethylene by reacting a main catalyst containing a titanium active site, an organoaluminum cocatalyst mixed with two or more types of organoaluminum, and an organosilane compound. The ultra-high molecular weight polyethylene prepared through this may have a high bulk density and a high molecular weight while having excellent polymerization activity.

For example, the present disclosure provides a method for producing ultra-high molecular weight polyethylene by introducing a mixture of a main catalyst having a titanium active site, two or more alkylaluminum cocatalysts, and an organosilane compound together in a continuous ethylene polymerization reactor.

In addition, the present disclosure provides a method for producing ultra-high molecular weight polyethylene having high activity and bulk density as well as a high molecular weight through a combination of a main catalyst, two or more types of organoaluminum cocatalyst and an organosilane compound in an appropriate ratio under continuous polymerization conditions.

The above-mentioned main catalyst may be a Ziegler-Natta catalyst in which titanium is supported on magnesium. The magnesium compound may be a magnesium halide compound, for example, magnesium chloride, magnesium dichloride ($MgCl_2$). For example, the above-mentioned main catalyst may be a Ziegler-Natta-based catalyst in which titanium is supported on magnesium dichloride ($MgCl_2$).

When the main catalyst is a Ziegler-Natta catalyst in which titanium is supported on magnesium dichloride ($MgCl_2$), it may be prepared by the method for producing the catalyst, comprising a first step of preparing a magnesium compound solution by reacting the magnesium dichloride ($MgCl_2$) with an alcohol; a second step of preparing a precursor by reacting the magnesium compound solution with titanium tetrachloride; and a third step of preparing a catalyst by primary-reacting the precursor with titanium tetrachloride, and then reacting the result with a diester compound represented by the following Formula 1;

$R_1OOCR_2COOR_3$ [Formula 1]

wherein $R_1$ and $R_3$ are a linear or branched alkyl group having 1 to 10 carbon atoms, and $R_2$ is a hydrocarbon having 1 to 20 carbon atoms.

In the method for preparing the catalyst, the type of the alcohol is not particularly limited, but an alcohol having 4 to 20 carbon atoms is preferable. For example, the alcohol may be n-butanol.

The alcohol may be mixed in an amount of 3 to 7 parts by weight, for example, 3 to 5 parts by weight, based on 1 weight of the magnesium dichloride compound. The hydrocarbon solvent may be mixed in a ratio of 9 to 16 parts by weight, for example, 10 to 15 parts by weight, based on 1 weight of the magnesium dichloride compound.

$R_2$ is a hydrocarbon having 1 to 20 carbon atoms, and may be an aliphatic hydrocarbon, an alicyclic hydrocarbon, or an aromatic hydrocarbon.

The aforementioned linear or branched alkyl group having 1 to 10 carbon atoms or the hydrocarbon having 1 to 20 carbon atoms is substituted or unsubstituted. Substitution may be performed with one or more substituents selected from the group consisting of deuterium, $C_1$-$C_{20}$ alkyl group, $C_1$-$C_{20}$ alkoxy group, $C_1$-$C_{20}$ alkylamine group, $C_1$-$C_{20}$ alkylthiophene group, $C_6$-$C_{20}$ arylthiophene group, $C_2$-$C_{20}$ alkenyl group, $C_2$-$C_{20}$ alkynyl group, $C_3$-$C_{20}$ cycloalkyl group, $C_6$-$C_{60}$ aryl group, $C_6$-$C_{60}$ aryl group substituted with deuterium, $C_8$-$C_{20}$ arylalkenyl group, and $C_2$-$C_{20}$ heterocyclic group containing at least one heteroatom selected from the group consisting of O, N, S, Si and P, but is not limited to these substituents.

The solvent used for polymerizing ultra-high molecular weight polyethylene may be a hydrocarbon solvent. The hydrocarbon solvent may be an aliphatic hydrocarbon having 1 to 20 carbon atoms such as pentane, hexane, heptane, octane, decane and kerosene, or an alicyclic hydrocarbon such as cyclopentane, methylcyclopentane, cyclohexane and methylcyclohexane. For example, the solvent used for polymerizing ultra-high molecular weight polyethylene may be linear, branched and cyclic saturated hydrocarbons such as propane, butane, isobutane, pentane, cyclopentane, hexane, cyclohexane, and heptane.

The organoaluminum cocatalyst used when polymerizing ultra-high molecular weight polyethylene may be a mixture of two or more types having a structure of AlRnX3-n (n is 1 to 3, R is a linear or branched alkyl group having 1 to 8 carbon atoms, and X is a halogen atom such as F, Cl, and Br, or a hydrogen atom).

The amount of the organoaluminum cocatalyst may be 0.1 to 100 moles of aluminum atoms of the cocatalyst per mole of titanium atoms of the main catalyst, but is not limited thereto.

The organosilane compound used when polymerizing ultra-high molecular weight polyethylene may be a compound represented by the following Formula 2.

[Formula 2]

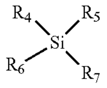

In Formula 2, $R_4$, $R_5$, $R_6$, and $R_7$ are each independently a linear, branched and cyclic alkyl group having 1 to 20 carbon atoms, alkoxy group having 1 to 20 carbon atoms, aryl group having 6 to 20 carbon atoms, and alkyl group having 1 to 20 carbon atoms including a heteroatom.

"Aryl group" has 6 to 60 carbon atoms, unless otherwise specified, but is not limited thereto. In the present application, the aryl group may include a monocyclic type, a ring aggregate, a fused multiple ring system, a spiro compound, and the like. For example, aryl group includes phenyl, biphenyl, naphthyl, anthryl, indenyl, phenanthryl, triphenylenyl, pyrenyl, perylenyl, chrysenyl, naphthacenyl, fluoranthenyl, and the like, but is not limited thereto. The naphthyl may include 1-naphthyl and 2-naphthyl, and the anthryl may include 1-anthryl, 2-anthryl and 9-anthryl.

"Heteroatom" refers to, but is not limited to, N, O, S, P or Si unless otherwise specified.

Linear, branched and cyclic alkyl groups having 1 to 20 carbon atoms, alkoxy groups having 1 to 20 carbon atoms, aryl groups having 6 to 60 carbon atoms and alkyl groups having 1 to 20 carbon atoms including heteroatoms may be substituted or unsubstituted. Substitution may be performed with one or more substituents selected from the group consisting of deuterium, $C_1$-$C_{20}$ alkyl group, $C_1$-$C_{20}$ alkoxy group, $C_1$-$C_{20}$ alkylamine group, $C_1$-$C_{20}$ alkylthiophene group, $C_6$-$C_{20}$ arylthiophene group, $C_2$-$C_{20}$ alkenyl group, $C_2$-$C_{20}$ alkynyl group, $C_3$-$C_{20}$ cycloalkyl group, $C_6$-$C_{60}$ aryl group, $C_6$-$C_{60}$ aryl group substituted with deuterium, $C_8$-$C_{20}$ arylalkenyl group, and $C_2$-$C_{20}$ heterocyclic group containing at least one heteroatom selected from the group consisting of O, N, S, Si and P, but is not limited to these substituents.

The amount of the organosilane compound may be 0.2 to 50 moles per mole of titanium atoms of the main catalyst, but is not limited thereto.

For example, the polymerization reaction during polymerizing the ultra-high molecular weight polyethylene may be performed under a pressure condition of 1 to 60 kg/$cm^2$ G and a temperature condition of 60 to 95° C. for the residence time of the reactant of 1 to 4 hours.

Ultra-high molecular weight polyethylene according to another embodiment may have a polymerization activity of 5 to 40 kg-PE/g-catalyst, so that it may be easy to control the polymerization reaction. In addition, the ultra-high molecular weight polyethylene has a viscosity average molecular weight of 2.0 to $10.0\times10^6$ g/ml, bulk density is 0.30 to 0.50 g/ml, and an average particle size is 100 to 150 μm, and particle agglomeration of 1 μm or more is 8.0 wt % or less. It can be easy to use in the UHMWPE processing.

Example 1

Preparation of Solid Catalyst for the Production of Ultra-High Molecular Weight Polyethylene First Step: Preparation of Magnesium Halide Alcohol Adduct Solution After replacing a 1 L reactor equipped with a mechanical stirrer with a nitrogen atmosphere, 20 g of solid magnesium dichloride ($MgCl_2$), 200 ml of toluene, and 120 ml of n-butanol were added and stirred at 350 rpm. The temperature was raised to 65° C. for 1 hour and then maintained for 2 hours to obtain a homogeneous solution of magnesium halide alcohol adduct well dissolved in the solvent.

Second Step: Preparation of Magnesium Halide Carrier

After cooling the temperature of the solution prepared in the first step to 20° C., 20 ml of $TiCl_4$ was slowly injected for 40 minutes (0.5 ml/min). After that, 62.5 ml of $TiCl_4$ was injected more rapidly for 100 minutes (0.625 ml/min). At this time, the temperature of the reactor was maintained with care not to increase above 25° C.

When the injection was completed, the temperature of the reactor was raised to 60° C. for 1 hour and maintained for an additional 1 hour.

When all processes were completed, the reactor was left still to completely sink the solid component. The supernatant was removed, and then the solid component in the reactor was washed once with 300 ml of toluene and precipitated to completely remove impurities in the liquid phase to obtain a clean magnesium chloride carrier as a solid.

Third Step: Preparation of Catalyst Supported with Titanium and Dimethyl Phthalate 200 ml of toluene was added to the magnesium chloride carrier, and the mixture was maintained at 25° C. while stirring at 250 rpm. After that, 30 ml of $TiCl_4$ was injected at a time and maintained for 1 hour for the primary reaction. Thereafter, 2 ml of dimethyl phthalate was injected, and the temperature of the reactor was raised to 60° C. and maintained for 1 hour to cause the secondary reaction between $TiCl_4$ and the carrier.

When all processes were completed, the reactor was left still to completely sink the solid component, and then the supernatant was removed. The prepared solid catalyst was washed once with 200 ml of toluene and 6 times with 200 ml of hexane and precipitated to remove impurities.

Polymerization of Ultra-High Molecular Weight Polyethylene

Ethylene was continuously flowed into the continuous polymerization reactor with a capacity of 4 liters, and the inside was filled with ethylene. The hexane dilution of the organoaluminum mixture was prepared so that it might become 0.5 M triisobutylaluminum and 0.5 M triethylaluminum. A catalyst hexane dilution solution of 1.0 M Titanium and dilution solution of 1.0 M organosilane, respectively, were prepared in different tanks.

While maintaining the reactor temperature at 80° C., the organoaluminum diluent, the catalyst diluent, and the organosilane diluent were injected at a constant rate such that Ti:TEAl:TIBA:Si=1:0.5:0.5:5. Hexane was continuously injected so that the total amount of hexane slurry inside the reactor was 2 liters. The internal pressure of the reactor was maintained at 5 kg/cm$^2$ G, and the residence time was maintained at 2 hours. The hexane slurry discharged from the reactor was filtered and dried to obtain ultra-high molecular weight polyethylene particles.

Example 2

Ultra-high molecular weight polyethylene was prepared in the same manner as in Example 1, except that triisobutylaluminum was changed to 0.25 mmol and triethylaluminum was changed to 0.75 mmol during polymerization in Example 1.

Example 3

Ultra-high molecular weight polyethylene was prepared in the same manner as in Example 1, except that triisobutylaluminum was changed to 0.75 mmol and triethylaluminum was changed to 0.25 mmol during polymerization in Example 1.

Example 4

Ultra-high molecular weight polyethylene was prepared in the same manner as in Example 1, except that triisobutylaluminum was changed to 1 mmol and triethylaluminum was changed to 1 mmol during polymerization in Example 1.

Example 5

Ultra-high molecular weight polyethylene was prepared in the same manner as in Example 1, except that triisobutylaluminum was changed to 0.25 mmol and triethylaluminum was changed to 0.25 mmol during polymerization in Example 1.

Comparative Example 1

Ultra-high molecular weight polyethylene was prepared in the same manner as in Example 1, except that triisobutylaluminum was changed to 0 mmol and triethylaluminum was changed to 1 mmol during polymerization in Example 1.

Comparative Example 2

Ultra-high molecular weight polyethylene was prepared in the same manner as in Example 1, except that triisobutylaluminum was changed to 1 mmol and triethylaluminum was changed to 0 mmol during polymerization in Example 1.

Comparative Example 3

Ultra-high molecular weight polyethylene was prepared in the same manner as in Example 1, except that dicyclopentyldimethoxysilane was not added during polymerization in Example 1.

The above-described Examples 1 to 5 and Comparative Examples 1 to 3 are summarized in Table 1 below based on the content of triisobutylaluminum and triethylaluminum.

TABLE 1

| Classification | Content of triisobutylaluminum (mmol) | Content of triethylaluminum (mmol) |
|---|---|---|
| Example 1 | 0.5 | 0.5 |
| Example 2 | 0.25 | 0.75 |
| Example 3 | 0.75 | 0.25 |
| Example 4 | 1 | 1 |
| Example 5 | 0.25 | 0.25 |
| Comparative example 1 | 0 (not included) | 1 |
| Comparative example 2 | 1 | 0 (not included) |
| Comparative example 3 | 0.5 | 0.5 |

<Measurement of Physical Properties, Evaluation Items and their Test Method>

Table 2 shows the results of measuring the physical properties of the ultra-high molecular weight polyethylene polymers prepared in Examples 1 to 5 and Comparative Examples 1 to 3 described above.

Polymerization Activity (Kg-PE/g-Catalyst)

Polymerization activity (kg-PE/g-catalyst) was calculated as the weight ratio of the polymer produced per amount of catalyst used.

Bulk Density (g/ml)

Bulk density was measured according to ASTM D1895-96.

Viscosity Average Molecular Weight ($\times 10^6$ g/Ml)

The molecular weight (Mv) of the polymer was calculated by measuring the intrinsic viscosity and using the Margolies equation.

Specifically, the molecular weight (Mw) was calculated from the intrinsic viscosity [η] according to ASTM D 4020. In the case of a polymer, the viscosity can provide useful information in a solution phase with dilute concentration. The value obtained by dividing the viscosity of the polymer by the viscosity and the concentration of the solution is called the specific viscosity. When the concentration of the polymer goes to zero, the extrapolated value of the specific viscosity is defined as the intrinsic viscosity (IV). Linear polymers have a high correlation with molecular weight because the IV value is mainly affected by the size of the polymer. In the case of ultra-high molecular weight polyethylene, the Margolies-equation is widely used.

$$Mw=5.37\times104\times[\eta]1.49$$

Mw=average molecular weight (g/mol)

[η]=intrinsic viscosity (dl/g)

Average Particle Size (μm)

The particle size distribution of the polymer was measured using a laser particle analyzer (Mastersizer X, Malvern Instruments). As a result, the average particle size was expressed as D(v, 0.5) and the particle size distribution was expressed as (D(v, 0.9)−D(v, 0.1))/D(v, 0.5).

Here, D(v, 0.5) represents the median size of the particles included in the sample, and D(v, 0.9) and D(v, 0.1), respectively, represent particle sizes located at 90% and 10% of the size distribution standard. The smaller the number of particle size distribution, the narrower the particle size distribution.

Aggregation of Particles with 1 μm or More (wt %)

For the agglomeration of polymer particles, the amount of aggregated particles relative to the total weight was measured using a metal sieve with a hole of 1 μm.

TABLE 2

| Classification | Activity (kg-PE/g-catalyst) | Bulk density (g/ml) | Viscosity average molecular weight ($\times 10^6$ g/ml) | Average particle size (μm) | Agglomeration of particles having 1 μm or more (wt %) |
|---|---|---|---|---|---|
| Example 1 | 21 | 0.45 | 6.5 | 137 | 1.3 |
| Example 2 | 24 | 0.43 | 5.0 | 140 | 0.8 |
| Example 3 | 11 | 0.40 | 7.0 | 122 | 7.8 |
| Example 4 | 26 | 0.45 | 4.1 | 141 | 0.9 |
| Example 5 | 6 | 0.37 | 7.5 | 111 | 5.5 |
| Comparative example 1 | 27 | 0.44 | 3.6 | 145 | 0.8 |
| Comparative example 2 | 7 | 0.41 | 7.3 | 115 | 11.0 |
| Comparative example 3 | 40 | 0.45 | 2.4 | 157 | 0.2 |

As shown in Table 2, it can be seen that the ultrahigh molecular weight polyethylene polymerized by the method of Example 1 has high activity, high bulk density, and high molecular weight and shows a very low level of large particle aggregation.

A rapid decrease in activity or a rapid decrease in molecular weight was observed depending on the mixing ratio of the added organoaluminum cocatalyst, indicating that there is an optimal value of the organoaluminum mixing ratio.

Through Examples 4 and 5, when the total amount of organoaluminum is increased, the molecular weight is rapidly decreased, and when the total amount of organoaluminum is decreased, the activation of the catalyst is inhibited, so that the activity is very low and particle agglomeration is rapidly increased.

In addition, for a single organoaluminum cocatalyst as in Comparative Examples 1 and 2, Comparative Example 1 shows a very low molecular weight, and Comparative Example 2 shows a very low activity and large particle agglomeration.

In addition, as in Comparative Example 3, even when the mixture of the organoaluminum cocatalyst is used in an appropriate ratio, it can be confirmed that the polymerization has a very low molecular weight without an external organosilane donor.

According to Table 2, in the polymerization of ultra-high molecular weight polyethylene, in order to obtain ultra-high molecular weight polyethylene with high activity, molecular weight, and bulk density at the same time and with less particle aggregation, the main catalyst, organoaluminum cocatalyst, and external organosilane donor must be properly combined.

As described above, the present disclosure provides a method for obtaining ultra-high molecular weight polyethylene particles having a high activity, high bulk density and high molecular weight at the same time exhibiting low particle agglomeration by introducing and polymerizing a main catalyst, a cocatalyst mixed with two or more types of organoaluminum, and an organosilane external electron donor together in a reactor in the polymerization of ultra-high molecular weight polyethylene.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for polymerizing ultra-high molecular weight polyethylene, the method comprising: reacting a main catalyst including a titanium active site, an organoaluminum cocatalyst mixed with two or more types of organoaluminum, and an organosilane compound to polymerize ultra-high molecular weight polyethylene.

2. The method for polymerizing ultra-high molecular weight polyethylene of claim 1, wherein the main catalyst is a Ziegler-Natta-based catalyst in which titanium is supported on magnesium dichloride ($MgCl_2$).

3. The method for polymerizing ultra-high molecular weight polyethylene of claim 2, wherein the main catalyst is prepared by the following method comprising:

a first step of preparing a magnesium compound solution by reacting the magnesium dichloride ($MgCl_2$) with an alcohol;

a second step of preparing a precursor by reacting the magnesium compound solution with titanium tetrachloride; and a third step of preparing a catalyst by primary-reacting the precursor with titanium tetrachloride, and then reacting the result with a diester compound represented by the following Formula 1;

$R_1OOCR_2COOR_3$ [Formula 1]

wherein $R_1$ and $R_3$ are a linear or branched alkyl group having 1 to 10 carbon atoms, and $R_2$ is a hydrocarbon having 1 to 20 carbon atoms.

4. The method for polymerizing ultra-high molecular weight polyethylene of claim 1, wherein a solvent used for polymerizing the ultra-high molecular weight polyethylene is one of linear, branched and cyclic saturated hydrocarbons.

5. The method for polymerizing ultra-high molecular weight polyethylene of claim 1, wherein the organoaluminum cocatalyst used for polymerizing the ultra-high molecular weight polyethylene includes a mixture of two or more having a structure represented by AlRnX3-n (n is 1 to 3, R is a linear or branched alkyl group having 1 to 8 carbon atoms, and X is a halogen atom such as F, Cl, and Br, or a hydrogen atom).

6. The method for polymerizing ultra-high molecular weight polyethylene of claim 5, wherein the amount of the organoaluminum cocatalyst is 0.1 to 100 moles of aluminum atoms of the cocatalyst per mole of titanium atoms of the main catalyst.

7. The method for polymerizing ultra-high molecular weight polyethylene of claim 1, wherein the organosilane compound used for polymerizing the ultra-high molecular weight polyethylene is a compound represented by the following Formula 2:

[Formula 2]

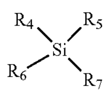

wherein $R_4$, $R_5$, $R_6$, and $R_7$ are each independently a linear, branched and cyclic alkyl group having 1 to 20 carbon atoms, alkoxy group having 1 to 20 carbon atoms, aryl group having 6 to 20 carbon atoms, and alkyl group having 1 to 20 carbon atoms including a heteroatom.

8. The method for polymerizing ultra-high molecular weight polyethylene of claim 7, wherein the amount of the organosilane compound is 0.2 to 50 moles per mole of titanium atoms of the main catalyst.

9. The method for polymerizing ultra-high molecular weight polyethylene of claim 1, wherein the polymerization reaction during polymerizing the ultra-high molecular weight polyethylene is performed under a pressure condition of 1 to 60 $kg/cm^2G$ and a temperature condition of 60 to 95° C. for the residence time of the reactant of 1 to 4 hours.

* * * * *